May 28, 1963     SABURO MATSUMOTO     3,091,161
CAMERA INCORPORATING EXPOSURE MEASURING DEVICE
Filed May 29, 1961
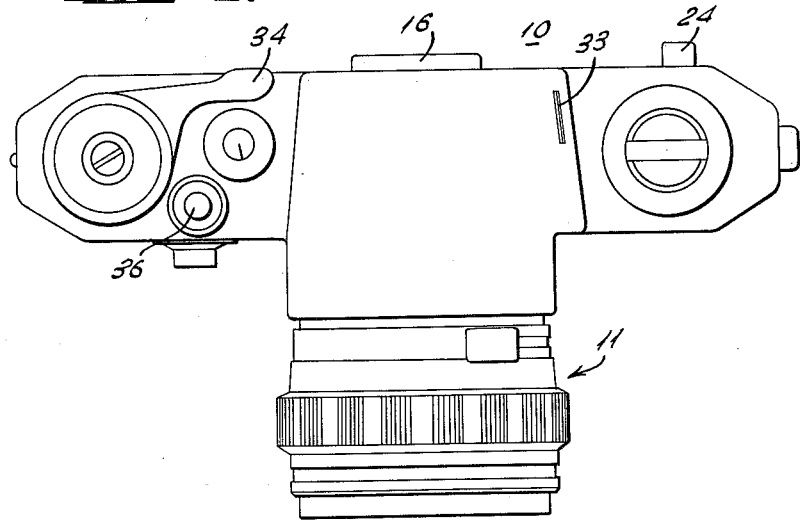
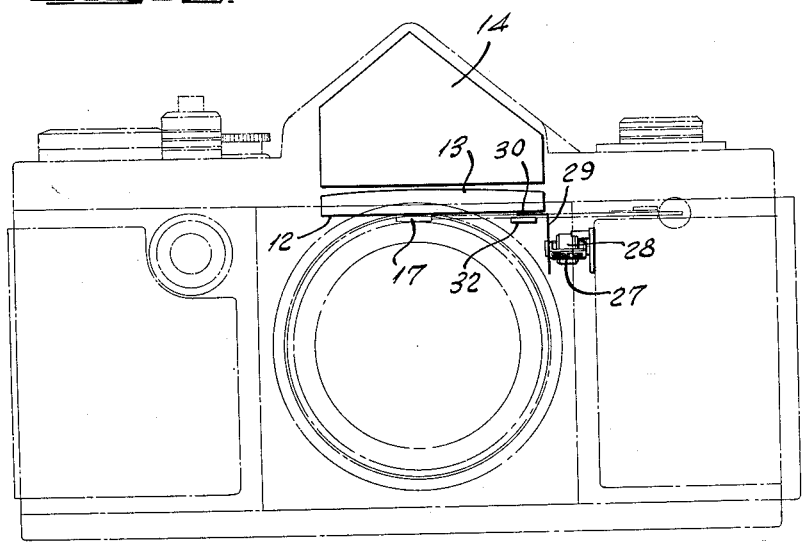
INVENTOR.
SABURO MATSUMOTO
BY Stanley W. Heck
ATTORNEY May 28, 1963  SABURO MATSUMOTO  3,091,161
CAMERA INCORPORATING EXPOSURE MEASURING DEVICE
Filed May 29, 1961  2 Sheets-Sheet 2
FIG_3_
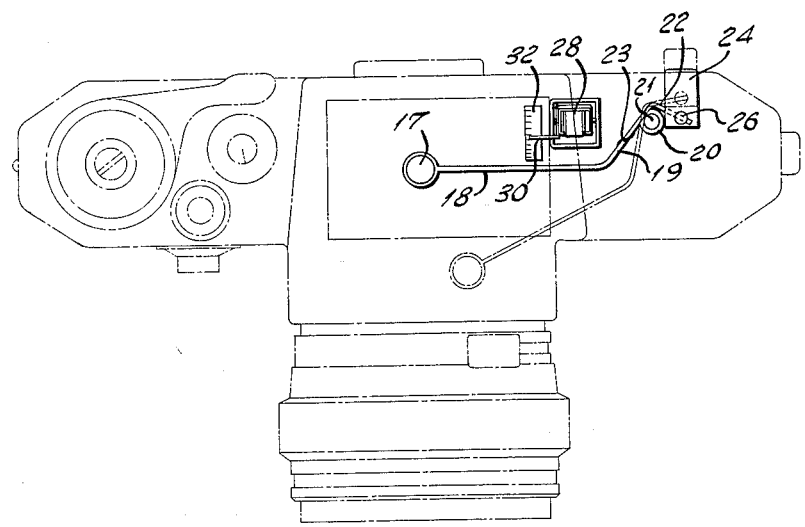
INVENTOR.
SABURO MATSUMOTO
BY Stanley Walder
ATTORNEY United States Patent Office 3,091,161
Patented May 28, 1963

3,091,161
CAMERA INCORPORATING EXPOSURE
MEASURING DEVICE
Saburo Matsumoto, Tokyo, Japan, assignor to Asahi
Optical Industry Co., Ltd. (Japanese name: Asahi Kogaku Kogyo Kabushiki Kaisha), Tokyo, Japan, a corporation of Japan
Filed May 29, 1961, Ser. No. 113,198
Claims priority, application Japan June 18, 1960
8 Claims. (Cl. 95—10)

The present inventon relates generally to improvements in photographic cameras and it relates more particularly to an improved camera of the type provided with a built-in photoelectric exposure meter.

It is a common practice to provide a photographic camera with a built-in photoelectric light measuring device which usually includes a photosensitive element such as a photoconductive cell or a self-generating photovoltaic cell and an electrical measuring mechanism such as a sensitive current meter which responds to the amount of light incident upon the photosensitive element. The photoelectric light measuring device is either independent of the camera mechanism, or may be visually or electrically coupled with the camera lens aperture and shutter mechanism or may be employed to automatically regulate the camera lens opening or shutter speed in accordance with the incident light conditions. The light sensitive element is conventionally independent of the camera picture lens and the light measurement effected thereby is frequently not a true indication of the light incident on the camera lens. As a consequence, an improper exposure often occurs and poor results achieved. Furthermore, it is difficult with the conventional light measuring systems to select predetermined areas of the photographed object which are of maximum interest and, hence, should determine the camera exposure conditions. There have been many proposals and suggestions for overcoming the above deficiencies of the conventional camera light measuring systems but these have possessed numerous drawbacks and disadvantages. They have undesirably interfered with the viewing properties of the camera, have been inaccurate or lacked adequate sensitivity, were not suitably selective and otherwise left such to be desired.

It is, therefore, a principal object of the present invention to provide an improved photographic camera.

Another object of the present invention is to provide an improved photographic camera of the type provided with a photoelectric light measuring system.

Still another object of the present invention is to provide an improved photographic camera with a built-in light measuring system of the type wherein the light measurement is made through the camera viewing lens.

A further object of the present invention is to provide an improved camera with a built-in light measuring system which is responsive to the light passing through the camera lens, and the light area being measured is observable and delineatable through the camera viewing system, the light measuring mechanism normally not interfering with the viewing procedure.

Still a further object of the present invention is to provide an impoved light measuing system of the above nature characterized by its simplicity, versatility, ruggedness and ease and dependability of operation.

The above and other objects of the present invention will become apparent from a reading of the following description taken in conjunction with the accompanying drawings, wherein:

FIG. 1 is a top plan view of a camera embodying the present invention;

FIG. 2 is a front elevational view of the improved light measuring mechanism, the camera being illustrated by dot and dash lines; and FIG. 3 is a top plan thereof, the light measuring element being shown by full line in its light measuring position and by broken line in its retracted position.

In a sense the present invention contemplates in combination with a camera including a lens, a light sensitive element movable between an advanced position substantially in registry with the focal plane of said lens and a retracted position spaced from said advanced position, and electrical means connected to said light sensitive element and responsive to the light incident thereon.

According to a preferred form of the improved combination, the camera is of the single lens reflex type provided with an eyepiece focused by way of a prism on the focal plane of the picture lens onto which the image is focused by way of a mirror in the usual manner. The photosensitive element is mounted on the free end of a pivoted arm which is normally spring urged to carry the photosensitive element out of registry with the lens focal plane and a finger piece is provided which is coupled to the pivoted arm to permit the swinging of the photosensitive element into registry with the lens focal plane. The photosensitive element is electrically connected to a sensitive current meter, the indicator element of which is located in the lens focal plane and a suitably illuminated scale registers with the meter indicator element so that both are visible through the eyepiece during the normal viewing operation. Moreover, the photosensitive element is only a small fraction of the viewed image on the focal plane so as to permit light measurement of selected areas with minimum interference with the viewing operation and is sufficiently large to provide suitable sensitivity.

Referring now to the drawings which illustrate a preferred embodiment of the present invention, the reference numeral 10 generally designates an improved camera provided with the present light measuring system. The camera 10 is of the direct viewing single lens reflex type including a barrel carrying main picture taking lens 11 mounted on the camera body and adjustable in the usual manner to focus an image on a focal plane 12 defined by the flat horizontal underface of a lens plate 13 of rectangular configuration. A swinging mirror of conventional construction is provided along the optical axis of the lens 11 to reflect the image on the focal plane 12 during the viewing operation and is swung out of intersection with the lens optical axis immediately preceding the operation of the shutter. The underface of the usual erecting prism 14 confronts the lens plate 13 and directs the light therefrom through an eyepiece lens 16 which is focused on the plane 12 by way of the prism 14 and plate 13 to provide a view of the area corresponding to that of the picture frame.

A photosensitive element 17 is mounted at the free end of a long wire arm 18 provided at its inner end with an angularly rearwardly directed leg 19. The trailing portion of the leg 19 is formed into a loop element 20 which encircles a pin 21 mounted on the camera body member and terminates a leg 22 forming a right angle with the leg 19. The arm 18 and the photosensitive element 17 lie in a plane immediately below the underface of the plate 13 which is at about the level of the focal plane 12 of the reflected rays of the lens 11. Moreover, the arm 18 is pivoted about the pin 21 so that the photosensitive element 17 is swingable with the arm 18 between an advanced position illustrated by full line in FIG. 3 of the drawing wherein the photosensitive element is located at substantially the center of the viewing frame focal plane 12 and a retracted position as illustrated in FIG. 3 by broken line wherein the photosensitive element 17 and the support arm 18 are out of registry with the focal plane 12.

The photosensitive element 17 and the arm 18 are normally resiliently urged toward their retracted positions by a hairpin spring 23 having one leg thereof engaging the leg 19 and the other leg thereof engaging a stationary abutment on the camera body member. A rearwardly directed transversely slidable finger piece or button 24 projects through the rear wall of the camera body and carries a vertical pin 26 having a bore engaging the leg 22. Thus upon depression of the button 24 the arm 18 and the photosensitive element 17 are swung against the influence of the spring 23 toward their advanced positions and upon release of the button 24 they are returned to their retracted positions by the spring 23.

The sensitive area of the photosensitive element 17 is directed downwardly and the photosensitive element may be of the self-generating photovoltaic type such as for example a selenium or silicon photoelectric cell or may be of the photoconductive type, for example a cadmium sulphide cell. The photosensitive element is electrically connected either directly or indirectly as by way of an amplifier, depending upon the type of photosensitive element employed, to the armature 27 of a sensitive current meter 28 located below and to the side of the lens plate underface 12. The armature 27 carries an indicator needle 29 terminating in a transversely directed horizontal leg 30 immediately underlying the plate underface 12 along a side border thereof. An indicia carrying member or scale 32 directly underlies the needle leg 30 and extends along the path thereof and is suitably illuminated by light directed thereon through a slit 33 formed on the top of the camera case in alignment with the scale 32.

In employing the camera described above, the photographer cocks the camera in the usual manner, directs it at the desired subject and focuses the lens 11 by viewing the subject through the eyepiece 16. While viewing the subject he depresses the button 24 to bring the photosensitive element across the field of view and he directs the camera so that the photosensitive element as viewed through the eyepiece coincides with the area of the subject the brightness measurement of which is desired. The subject under view, the photosensitive element 17, the meter indicator 30, and the meter scale 32 are clearly, sharply and simultaneously seen through the eyepiece 16 so that the brightness of the desired area is readily and easily determined and the camera diaphragm aperture and shutter speed may be accordingly adjusted. Moreover, the photoelectric meter may be coupled to the lens diaphragm and shutter speed control in the usual manner permitting the adjustment of these parameters while viewing the subject to be photographed. Before triggering the shutter mechanism, the button 24 is released permitting the return of the photosensitive element 17 to its retracted position and permitting an impeded view of the subject through the camera.

The camera 10 is provided with a swingable film advancing and shutter winding or cocking lever 34 and a depressible shutter release button or trigger 36.

While there have been described and illustrated preferred embodiments of the present invention it is apparent that numerous alterations, omissions and additions may be made without departing from the spirit thereof.

What is claimed is:

1. In combination with a camera including a main picture lens adapted to focus an image on a frame delineated focal plane, a light sensitive element of relatively small area movable between an advanced position substantially in registry with a small fraction of said focal plane and a retracted position spaced from said advanced position, a current meter electrically connected to said light sensitive element and including an indicator member disposed in the vicinity of said focal plane and a viewing lens focussed on said focal plane and affording a concurrent view of said indicator member, said image and the image intercept of said light sensitive element.

2. In combination with a camera including a main picture lens adapted to focus an image on a frame delineated focal plane, a light sensitive element of relatively small area movable between an advanced position substantially in registry with a small fraction of said focal plane and a retracted position spaced from registry therewith, spring means normally urging said light sensitive element to its retracted position, a current meter electrically connected to said light sensitive element and including an indicator member disposed in the vicinity of said focal plane and a viewing lens focussed on said focal plane and affording a concurrent view of said indicator member, said image, and the image intercept of said light sensitive element.

3. In combination with a camera including a main picture lens adapted to focus an image on a frame delineated focal plane, a light sensitive element of relatively small area movable between an advanced position substantially in registry with a small fraction of said focal plane and a retracted position spaced from registry therewith, spring means normally urging said light sensitive element to its retracted position, manipulative means adapted to urge said light sensitive element to its advanced position, a current meter electrically connected to said light sensitive element and including an indicator member disposed in the vicinity of said focal plane and a viewing lens focussed on said focal plane and affording a concurrent view of said indicator member, said image, and the image intercept of said light sensitive element.

4. In combination with a single lens reflex camera comprising an optical system including a main lens adapted to focus an image on a frame delineated focal plane and a viewing system directed to said focal plane, a light sensitive element of relatively small area movable between an advanced position substantially in registry with a small fraction of said focal plane and a retracted position out of registry therewith, and a current meter electrically connected to said light sensitive element and including an indicator member observable through said viewing system with said image and the image intercept of said light sensitive element.

5. The combination according to claim 4 including spring means normally urging said photosensitive element to its retracted position.

6. The combination according to claim 5 including manipulative means adapted to urge said photosensitive element to its advanced position.

7. The combination according to claim 4 wherein said meter indicator lies substantially in said focal plane.

8. The combination in accordance with claim 7 including a scale lying substantially in said focal plane and registering with said indicator.

References Cited in the file of this patent

UNITED STATES PATENTS

| | | |
|---|---|---|
| 2,754,735 | Meyer | July 17, 1956 |
| 2,784,654 | Meyer | Mar. 12, 1957 |
| 2,933,991 | Sauer | Apr. 26, 1960 |
| 2,937,582 | Goshima | May 24, 1960 |
| 2,960,921 | Greger | Nov. 22, 1960 |
| 2,975,687 | Greger | Mar. 21, 1961 |

FOREIGN PATENTS

| | | |
|---|---|---|
| 1,128,983 | France | Sept. 3, 1956 |